United States Patent Office 3,321,494
Patented May 23, 1967

3,321,494
PROCESS FOR PREPARING TRIAMINO-
GUANIDINIUM AZIDE
Earl Thomas Niles, Danville, Calif., assignor to The Dow
Chemical Company, Midland, Mich., a corporation of
Delaware
No Drawing. Filed May 24, 1963, Ser. No. 282,935
5 Claims. (Cl. 260—349)

This invention relates to a novel process for preparing triaminoguanidinium azide in high purity and high yield.

It is a principal object of the present invention to provide a process for the preparation of high purity triaminoguanidinium azide in high yield directly from a guanidine source material, a hydrazine source material and an azide ion source material. The term "guanidine source material" as used herein includes, for example, guanidine carbonate, guanidine sulfate, aminoguanidine sulfate, guanidine bisulfate, guanidine bicarbonate, aminoguanidine bisulfate, aminoguanidine bicarbonate and the like materials. The term "hydrazine source material" as used herein includes, for example, hydrazine sulfate, $$[(N_2H_4)_2H_2SO_4]$$

hydrazine bisulfate $[N_2H_4 \cdot H_2SO_4]$, hydrazine, hydrazine hydrate and the like. The term "azide source material" as used herein refers to inorganic azide salts and preferably to alkali metal-, alkaline earth metal- and ammonium azide salts.

It is another object of the present invention to provide a novel process for the preparation of high purity triaminoguanidinium azide which is substantially free of decomposition products.

It is also an object of the present invention to provide a safe, simple and highly efficient process for producing triaminoguanidinium azide.

These and other objects and advantages readily will become apparent from the detailed description presented hereinafter.

In accordance with the present process, high purity triaminoguanidinium azide is produced in good yield by reacting (1) a guanidine source material with (2) a hydrazine source material wherein at least one of the reactant materials (1) and (2) also contains a source of sulfate ions and (3) an alkali metal-, alkaline earth-or ammonium azide salt preferably in the presence of a substantially non-hygroscopic, inert liquid in which inorganic sulfate is substantially insoluble and wherein triaminoguanidinium azide is soluble.

Conveniently the guanidine source material is obtained by reacting cyanamide or calcium cyanamide with hydrazine sulfate or hydrazine bisulfate. For example, cyanamide readily reacts with hydrazine sulfate to prepare monoaminoguanidinium sulfate in accordance with the following equation:

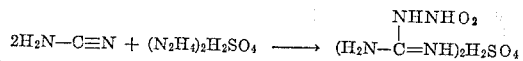

This preparation serves not only to form the desired guanidine sulfate reactant, but also provides for simultaneous introduction of the first amino group into the molecule. Further, no ammonia is displaced thereby effecting a highly efficient usage of reactants. Likewise, there is no free base or azide present until after the monoaminoguanidine entity is formed.

The high purity product prepared by the present process is particularly suitable for use in rocket propellant formulations where storage stability and high energy is required. Contaminants, such as heavy metals, for example, lead to decomposition of the triaminoguanidinium azide. Also, the presence of sodium ion for example, is detrimental in propellants.

A prime advantage of the present process is that the presence of hazardous amounts of free hydrazoic acid at any one time in the reaction mixture is eliminated. Hydrazoic acid, as is well understood, in itself is both extremely explosive and toxic.

In carrying out the present process, preferably for highest yields the reaction mixture will contain hydrazine source material and guanidine source material in a gram mole ratio of at least 3 (expressed as hydrazine/guanidine) and a guanidine source material/azide source material gram mole ratio of at least 1 (expressed as guanidine/azide ion).

Although the ratios of reactants set forth hereinbefore are preferred for the production of the triaminoguanidinium azide in the highest yields, it is to be understood that high purity product can be produced by the present process using reactant ratios differing from those shown although the yield may be reduced.

The reaction mixture is heated at a temperature of from about 60 to about 140° C., and preferably at reflux, for a period of from about 0.25 to about 4 hours or more at atmospheric or superatmospheric pressures.

Following the reaction period, the inorganic sulfate produced is separated from the triaminoguanidinium azide product and this latter product recovered from the residual reaction mixture.

If the reaction is carried out in the absence of materials other than the reactants, the resulting substantially dry product cake ordinarily is contacted with a quantity of liquid carrier to dissolve the triaminoguanidinium azide product away from the metal sulfate. In this embodiment, conveniently the solid product mixture is refluxed with the solvent or subjected to other extraction techniques. The resulting solution is then separated from the residual solid sulfate and the product recovered therefrom.

When a suitable liquid carrier is used in the reaction mixture during the preparative step, the inorganic sulfate precipitates directly therein. After the reaction period, this precipitate readily is separated from the product solution, as by filtering, and the triaminoguanidinium azide product subsequently recovered from the substantially solids-free solution. The triaminoguanidinium azide product is recovered from the solution by cooling to crystallize the product therein, concentrating, or otherwise treating the product solution to reduce the solubility of triaminoguanidinium azide therein.

Conveniently, the reaction mixture is filtered while hot to remove the inorganic sulfate and the substantially solids-free solution cooled to a temperature of from about minus 10 to about plus 30° C. whereupon direct crystallization of the triaminoguanidinium azide product results.

Ordinarily the process is carried out by heating a mixture of the azide salt and liquid carrier, e.g., substantially anhydrous methanol, and the guanidine source material and hydrazine source material at from about 60 to about 80° C.

When using cyanamide and hydrazinium ion source to prepare the guanidine source material, activation of this reaction mixture begins at a temperature of about 60° C. and once started the initial reaction proceeds spontaneously and exothermally. Therefore predetermined incremental additions of the cyanamide and hydrazine materials to the reaction mass can be made at this stage to controllably maintain the reaction temperature within the range set forth herein. Alternatively exterior temperature control, such as refrigeration coils, ice baths, cold water, etc, can be employed to cool the reaction mixture.

The subsequent reactions between hydrazine and the substituted guanidinium ion are not exothermic. Therefore, incremental additions of the reactants are not necessary in the latter stage.

Liquid carriers ordinarily employed are the substantially anhydrous alkanols having from 1 to about 3 carbon atoms (methanol, ethanol and isopropanol being preferred), (2) 95% hydrazine solution, (3) hydrazine, or (4) hydrazine hydrate carried in excess of the hydrazine requirement of the process.

The amount of liquid carrier to be employed is not critical but must be sufficient to dissolve the triaminoguanidinium azide product in the product mixture. If excessive amounts of the liquid are employed, the bulk to be handled may become unwieldy. To illustrate, with methanol at about the reflux temperature the ratio of the alcohol to triaminoguanidinium azide product which ordinarily is used ranges from about 12:1 to about 25:1 on a weight basis.

Sodium azide ordinarily is used as the azide source although the other alkali metal and alkaline earth metal azides can be employed. Ammonium azide, preferably in solution, also can be used in the present process.

The novelty of the present process is accentuated by the facts that (1) triaminoguanidinium azide is produced from a reaction mixture containing a guanidine source material and a hydrazine source material and (2) that high yields of very high purity product result from a reaction mixture comprising a source of azide, hydrazine and guanidine (or aminoguanidine) sulfate.

It is the unique bringing together of the three source materials in combination that renders the present novel process operable. To explain: the treatment of guanidine sulfate with hydrazine for direct preparation of triaminoguanidinium sulfate (which allegedly subsequently could be expected to react wtih azide) does not succeed. Insoluble diaminoguanidinium sulfate precipitates as the primary product. Attempts to force the reaction further to prepare triaminoguanidine sulfate results only in extensive decomposition. Unexpectedly, in accordance with the present process when azide ion is present simultaneously in the reaction mixture along with the guanidine sulfate source material and the hydrazine source, the triaminoguanidinium azide product is produced directly in high yield.

The presence of azide in the reaction mixture actually would be expected to be a deterrent from producing the product in the high yields obtained by the present novel process. With azide, evolved ammonia and hydrazine present in the reaction mass, the following equilibrium between the triaminoguanidinium azide and the free bases can exist thereby permitting competition for the azide.

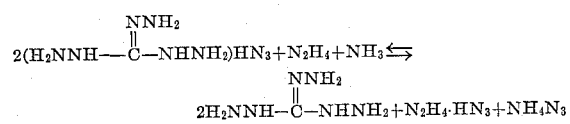

This equilibrium predicts that high yields of the triaminoguanidinium azide product should not be obtained. Further, it would ordinarily be expected with ammonia present, there would be a detrimental loss of the product by removal of azide from the system as the volatile ammonium salt, $NH_4N_3$. By practicing the present novel process, the expected actions do not occur and unexpectedly triaminoguanidinium azide is produced in high yield and high purity.

The present process is carried out in batch-type operations, on a continuous basis, or in cyclic batch type operations.

Reaction vessels, material handling, storage and transport equipment are to be constructed of materials that do not detrimentally affect and are not attacked by the reactants, liquid carrier or products. Also the processing equipment must have sufficient strength and physical characteristics so as to be operable at the processing conditions.

The following examples will serve to further illustrate the present invention, but are not meant to limit it thereto.

Example 1

A 500 milliliter round-bottom flask was charged with about 38.7 cubic centimeters of a 50 percent aqueous cyanamide solution (solution contained about 0.5 mole $NH_2CN$) and about 40.5 grams of hydrazine sulfate. The reaction mixture was heated externally. At about 80° C. the reaction became exothermic. The temperature rose to about 130° C. within about one minute, remained at this temperature for an additional minute and then started to drop. This indicated substantially complete reaction and preparation of monoaminoguanidinium sulfate.

When the reaction mass had cooled to about 60° C., about 55 grams (1 gram mole) of hydrazine hydrate and about 32.5 grams (0.5 gram mole) of sodium azide were added. The resulting monoaminoguanidinium sulfate-hydrazine-sodium azide reaction mixture was heated on a steam bath for an additional hour (during which time some ammonia was evolved). After this period, the reaction mass was rapidly evaporated under reduced pressure at steam bath temperature. About 1 liter of methanol was added to the resulting, substantially dry product cake and the mixture refluxed for about one hour. The resulting slurry was filtered while hot to remove the insoluble sodium sulfate therefrom. The filtrate was cooled to a temperature of about minus 22° C. whereupon about 57 grams (77.5% yield) of white crystalline triaminoguanidinium azide product crystallized directly therein. Subsequent analysis of the product indicated this material to be substantially pure triaminoguanidinium azide which included less than 0.2% by wt. of sodium.

Example 2

About 405 grams (2.5 gram mole) of hydrazine sulfate $(N_2H_4)_2H_2SO_4$ was placed in a 3000 milliliter flask at room temperature and about 50 milliliters of a 50% aqueous cyanamide ($NH_2CN$) solution added. The mixture was agitated while heating to about 60° C. at which point the reaction became exothermic, the reaction mix temperature rising to a maximum of about 120° C. Additional portions of the cyanamide solution were added incremenetally over a two hour period to the agitating reaction mixture in amounts to maintain the temperature between about 110 and 120° C. The entire amount of cyanamide added was about 402 grams (5 gram moles). About five minutes after the last cyanamide addition had been made, the reaction temperature started to drop. When the temperature reached about 65° C. about 820 milliliters of substantially anhydrous methanol was added to the mixture, while still being continuously stirred, and the resulting slurry was filtered. About 805 grams of crude monoaminoguanidinium sulfate were recovered which contained about 25% weight methanol. The calculated solvent-free weight of the product cake corresponded to a yield of over 98 percent.

About 61.5 grams (0.25 gram mole) of the dried monoaminoguanidinium sulfate product, about 35.5 grams hydrazine and about 32.7 grams sodium azide were admixed with about 500 grams of substantially anhydrous methanol in a two liter flask equipped with a stirrer, reflux condensor, heating mantle and inlet for nitrogen gas.

The mixture was refluxed under a nitrogen blanket for about 1.5 hours and then cooled with an ice bath to precipitate the least soluble components therein. The resultant slurry was filtered and the filtrate containing the more soluble components was returned to the reaction flask for the next run. The resulting filter cake was washed with 50 grams of cold substantially anhydrous methanol. This wash also was returned to the reaction flask.

The filter cake was placed along with 500 grams of substantially anhydrous methanol in a second 2-liter flask fitted with a stirrer and brought to reflux while stirring.

The mixture was filtered while hot and the resultant sodium sulfate filter cake was washed with 50 grams of hot methanol.

This wash material was added to the hot filtrate and the resultant solution cooled with an ice bath to precipitate the high purity triaminoguanidinium azide product. This product was then separated and recovered.

Additional samples of the previously prepared monoaminoguanidinium sulfate were subjected to this same process utilizing the same liquid vehicle carrier from run to run. A total of 15 runs were made after which the final filtrate was analyzed to complete a material balance and determine the yield to be expected in continuous operation.

The actual triaminoguanidinium azide product crystallized and recovered from the solution phase was about 5.84 gram moles. This was about a 77% product yield based on the monoaminoguanidine sulfate reactant. An additional 0.64 gram mole of the product was found to be present in the combined filtrate from the 15 runs, the overall product yield therefore being about 86.5%.

Additionally, diaminoguanidinium azide, hydrazine and a small amount of sodium azide were found in the filtrate upon analysis.

In a manner similar to that described for the foregoing examples, triaminoguanidinium azide can be prepared by reacting (a) guanidine carbonate, hydrazine bisulfate, hydrazine and sodium azide in the presence of isopropanol, (b) hydrazine sulfate, sulfuric acid and calcium cyanamide, then adding potassium azide and hydrazine, (c) guanidine sulfate, hydrazine hydrate and calcium azide, (d) guanidine bisulfate, hydrazine and potassium azide in the presence of isopropanol, (e) aminoguanidine bicarbonate, hydrazine sulfate and ammonium azide, and the like materials.

Various modifications can be made in the present invention without departing from the spirit or scope thereof for it is understood that I limit myself only as defined in the appended claims.

I claim:

1. A process for preparing triaminoguanidinium azide which comprises: (1) providing a reaction mixture of (a) a guanidine source material, (b) a hydrazine source material, at least one of the members (a) and (b) also providing a source of sulfate ion, and (c) an azide source material, said guanidine source material being a member selected from the group consisting of guanidine carbonate, guanidine sulfate, aminoguanidine sulfate, guanidine bisulfate, guanidine bicarbonate, aminoguanidine bisulfate and aminoguanidine bicarbonate, said hydrazine source material being a member selected from the group consisting of hydrazine sulfate, hydrazine bisulfate, hydrazine and hydrazine hydrate and said azide source material being a member selected from the group consisting of the alkali metal-, alkaline earth metal- and ammonium azides; (2) reacting said mixture for a period of time of from about 0.25 to about 4 hours over a temperature range of from about 60 to about 140° centigrade thereby to precipitate the corresponding inorganic sulfate salt wherein the cation of said sulfate salt is the cation member of said azide reactant; (3) separating the precipitated inorganic sulfate salt from the reaction medium, and (4) recovering the triaminoguanidinium azide product.

2. The process as defined in claim 1 and including the steps of:

treating the product mixture after the reaction at the elevated temperatures with a liquid carrier, said liquid carrier being a solvent for the triaminoguanidinium azide product and a nonsolvent for the inorganic sulfate salt thereby to dissolve the triaminoguanidine azide product away from the metal sulfate, separating the solid inorganic sulfate from the solution of said triaminoguanidinium azide, and recovering the triaminoguanidinium azide product from said solution.

3. A process as defined in claim 2 wherein the liquid carrier is a substantially anhydrous alkanol having from 1 to about 3 carbon atoms, and including the steps of refluxing the product mixture with said carrier thereby to dissolve the triaminoguanidinium azide product away from the metal sulfate and cooling the resulting solution of said triaminoguanidinium azide in said carrier to a temperature of less than about 35° C. thereby to crystallize said triaminoguanidine azide product directly in said solution.

4. The process for preparing triaminoguanidinium azide which comprises:

(1) forming a mixture of an azide salt selected from the group consisting of alkali metal and alkaline earth metal azides and ammonium azide in a liquid carrier selected from the group consisting of substantially anhydrous alkanols having from 1 to about 3 carbon atoms, 95 percent hydrazine solution, hydrazine and hydrazine hydrate carried in hydrazine, with a guanidine sulfate source material and hydrazine source material, said guanidine sulfate source material being a member selected from the group consisting of guanidine carbonate, guanidine sulfate, aminoguanidine sulfate, guanidine bisulfate, guanidine bicarbonate, aminoguanidine bisulfate and aminoguanidine bicarbonate, said hydrazine source material being a member selected from the group consisting of hydrazine sulfate, hydrazine bisulfate, hydrazine and hydrazine hydrate, with the further requirement that at least one of the members (a) guanidine sulfate source material and (b) hydrazine source material provide a source of sulfate ion, (2) heating said mixture to and maintaining said mixture at a reaction temperature of from about 60° to about 140° C., (3) separating the precipitated metal sulfate from the hot reaction mixture, (4) cooling the resultant product solution to a maximum temperature of at least about 35° C. thereby to precipitate said triaminoguanidinium azide product directly therein, and (5) recovering the crystallized triaminoguanidinium azide product from the reaction medium.

5. A process for preparing triaminoguanidinium azide which comprises:

(1) reacting a 50 percent aqueous cyanamide solution and hydrazine sulfate at a temperature of from about 80 to about 130° C. thereby to prepare monoaminoguanidinium sulfate, (2) adding hydrazine hydrate and sodium azide to the monoaminoguanidinium sulfate containing reaction mixture, the ratio of said hydrazine hydrate to said monoaminoguanidinium sulfate being about 2 on a gram mole basis and the gram mole ratio of said sodium azide to said monoaminoguanidinium sulfate being about 1, (3) heating the reaction mixture within the temperature range of from about 60 to about 140° C. for about 1 hour, drying the resulting product mixture, adding substantially anhydrous methanol to said dried product mixture sufficient to dissolve the triaminoguanidinium azide product present in the said product mixture and refluxing the resultant mixture for a period of time so as to dissolve substantially all of said triaminoguanidinium azide, filtering the resulting slurry while hot to remove the insoluble sodium sulfate therefrom, cooling the resulting substantially solids-free filtrates to a temperature of from about −20 to about 0° C. thereby to crystallize the triaminoguanidinium azide product from said alcoholic medium.

No references cited.

WALTER A. MODANCE, Primary Examiner.

JOHN M. FORD, Assistant Examiner.